(12) United States Patent
Krause et al.

(10) Patent No.: US 7,582,164 B1
(45) Date of Patent: Sep. 1, 2009

(54) TIRE DRESSING SYSTEM

(75) Inventors: David Krause, DePere, WI (US); Forrest R. Burton, Center City, MN (US)

(73) Assignee: Cleaning Systems, Inc., DePere, WI (US)

( * ) Notice: Subject to any disclaimer, the term of this patent is extended or adjusted under 35 U.S.C. 154(b) by 0 days.

(21) Appl. No.: 12/044,684

(22) Filed: Mar. 7, 2008

Related U.S. Application Data

(63) Continuation of application No. 12/024,133, filed on Feb. 1, 2008, now abandoned.

(51) Int. Cl.
*B05C 3/00* (2006.01)
*B05C 11/00* (2006.01)
*B08B 3/04* (2006.01)

(52) U.S. Cl. .............. 118/323; 118/321; 118/712; 118/669; 118/680; 134/123; 134/45

(58) Field of Classification Search ........... 118/712, 118/713, 323, 679–681, 321, 668, 669, 676, 118/708; 134/123, 45; 15/53.1, 97.3; 427/427.1, 427/427.2, 427.3; 239/73
See application file for complete search history.

(56) References Cited

U.S. PATENT DOCUMENTS

| | | | | |
|---|---|---|---|---|
| 3,255,037 A | * | 6/1966 | Knight et al. | 427/424 |
| 6,024,147 A | * | 2/2000 | Hunter, Jr. | 156/356 |
| 6,082,634 A | * | 7/2000 | MacNeil | 239/263 |
| 6,383,295 B1 | * | 5/2002 | Frederick et al. | 118/680 |

* cited by examiner

*Primary Examiner*—Yewebdar T Tadesse
(74) *Attorney, Agent, or Firm*—Michael Neustel

(57) ABSTRACT

A tire dressing system for efficiently and accurately applying tire dressing to vehicle tires. The tire dressing system generally includes a support unit, a spray unit movably positioned within the support unit, an actuator unit connected to the spray unit, a tire sensor to determine the size of a vehicle tire, and a tire position sensor to determine the location of the vehicle tire. The spray unit includes a hollow cone nozzle telescopically supported within the spray unit to adjust the spray pattern applied to the sidewall of the vehicle tire depending upon the size of the vehicle tire. After the size of the vehicle tire is determined, the proximity of the hollow cone nozzle is adjusted to apply the desired spray pattern to the sidewall. The hollow cone nozzle then applies the dressing to the sidewall of the vehicle tire as the vehicle moves by the spray unit.

18 Claims, 12 Drawing Sheets

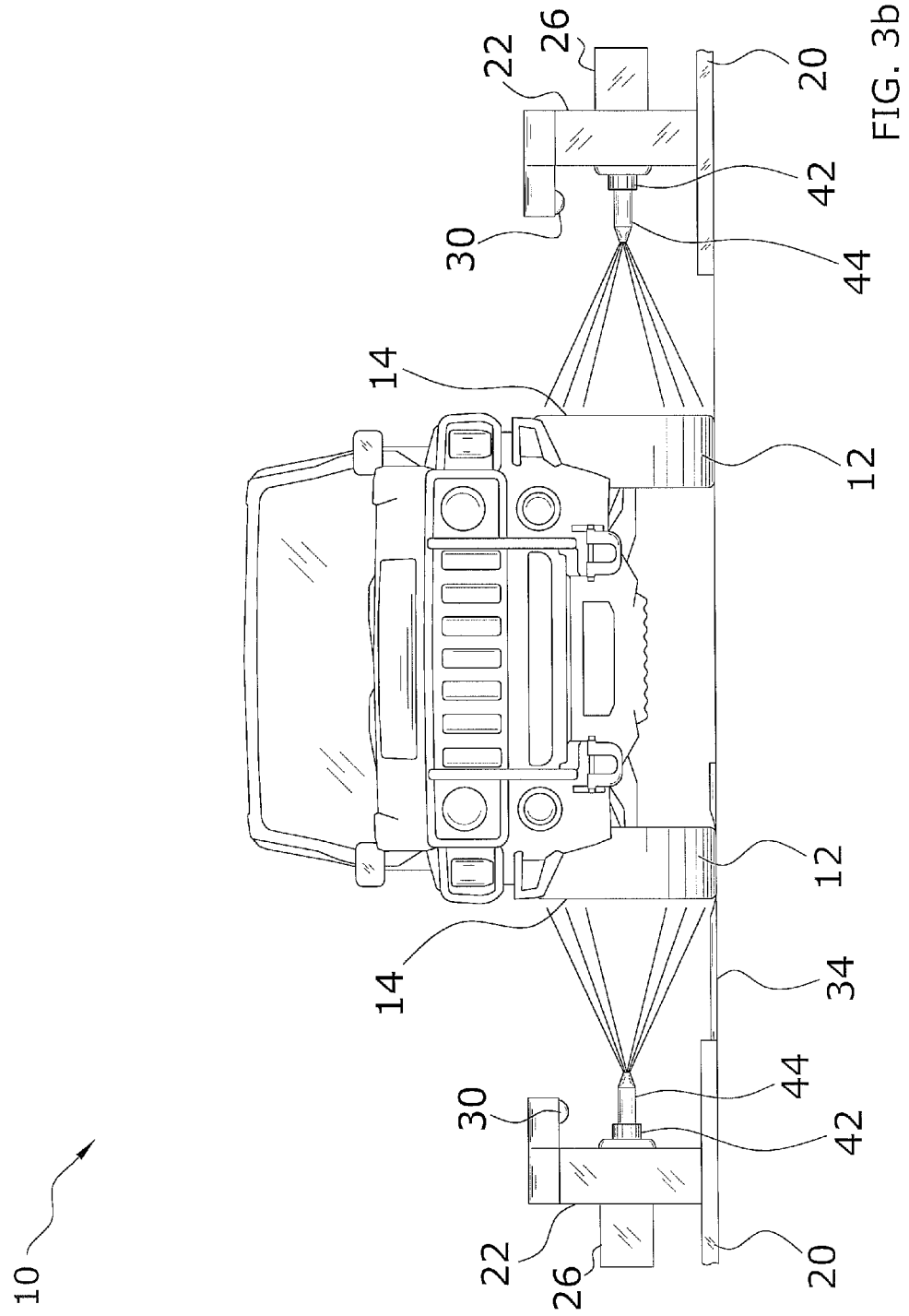

TIRE DRESSING SYSTEM

CROSS REFERENCE TO RELATED APPLICATIONS

We hereby claim benefit under Title 35, United States Code, Section 120 of U.S. patent application Ser. No. 12/024,133 filed Feb. 1, 2008. This application is a continuation of the application Ser. No. 12/024,133. The application Ser. No. 12/024,133 is now abandoned. The application Ser. No. 12/024,133 is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to tire dressing applicators and more specifically it relates to a tire dressing system for efficiently and accurately applying tire dressing to vehicle tires.

2. Description of the Related Art

Any discussion of the related art throughout the specification should in no way be considered as an admission that such related art is widely known or forms part of common general knowledge in the field.

Tire dressings are used to improve the appearance and durability of tires. Tire dressings may be comprised of various types of solutions including solvent based dressings and water based dressings. Tire dressings are typically applied to tires manually by a user using a spray bottle, a sponge or rag, or a pressurized applicator system with a brush. Recently, automated tire dressing systems have been developed that utilize mechanized applicators (e.g. brushes, clothes, sponges) that apply the tire dressing directly to the sidewall of the vehicle tire.

The main problem with conventional tire dressing applicators is that they require significant labor by the user to apply the tire dressing. In addition, conventional tire dressing applicators require the user to accurately spray the tire without engaging the rims or body of the vehicle. A problem with conventional automated tire dressing systems is that the mechanized equipment displaces a significant amount of valuable space within the carwash and are susceptible to damage because of the direct physical engagement with the vehicle tires.

Because of the inherent problems with the related art, there is a need for a new and improved tire dressing system for efficiently and accurately applying tire dressing to vehicle tires.

BRIEF SUMMARY OF THE INVENTION

The general purpose of the present invention is to provide a tire dressing system that has many of the advantages of the tire dressing applicators mentioned heretofore. The invention generally relates to a tire dressing applicator which includes a support unit, a spray unit movably positioned within the support unit, an actuator unit connected to the spray unit, a tire sensor to determine the size of a vehicle tire, and a tire position sensor to determine the location of the vehicle tire. The spray unit includes a hollow cone nozzle telescopically supported within the spray unit to adjust the spray pattern applied to the sidewall of the vehicle tire depending upon the size of the vehicle tire. After the size of the vehicle tire is determined, the proximity of the hollow cone nozzle is adjusted to apply the desired spray pattern to the sidewall. The hollow cone nozzle then applies the dressing to the sidewall of the vehicle tire as the vehicle moves by the spray unit.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a tire dressing system for efficiently and accurately applying tire dressing to vehicle tires after a vehicle has been washed in an automatic car wash.

Another object is to provide a tire dressing system that provides precise control over the tire dressing application process.

An additional object is to provide a tire dressing system that avoids over spraying and under spraying of a tire dressing compound to a sidewall of a tire.

A further object is to provide a tire dressing system that is capable of applying a tire dressing to a sidewall of a tire while the vehicle is moving or stationary.

Another object is to provide a tire dressing system that prevents over spraying and under spraying a sidewall.

A further object is to provide a tire dressing system that prevents application of the tire dressing to the rim of the vehicle tire or the body of the vehicle.

A further object is to provide a tire dressing system that minimizes the amount of tire dressing required to completely spray a sidewall.

A further object is to provide a tire dressing system that applies tire dressing in an automated manner.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3b is a front view of the present invention applying tire dressing to the sidewalls of the vehicle tires.

DETAILED DESCRIPTION OF THE INVENTION

A. Overview

Figure 1:
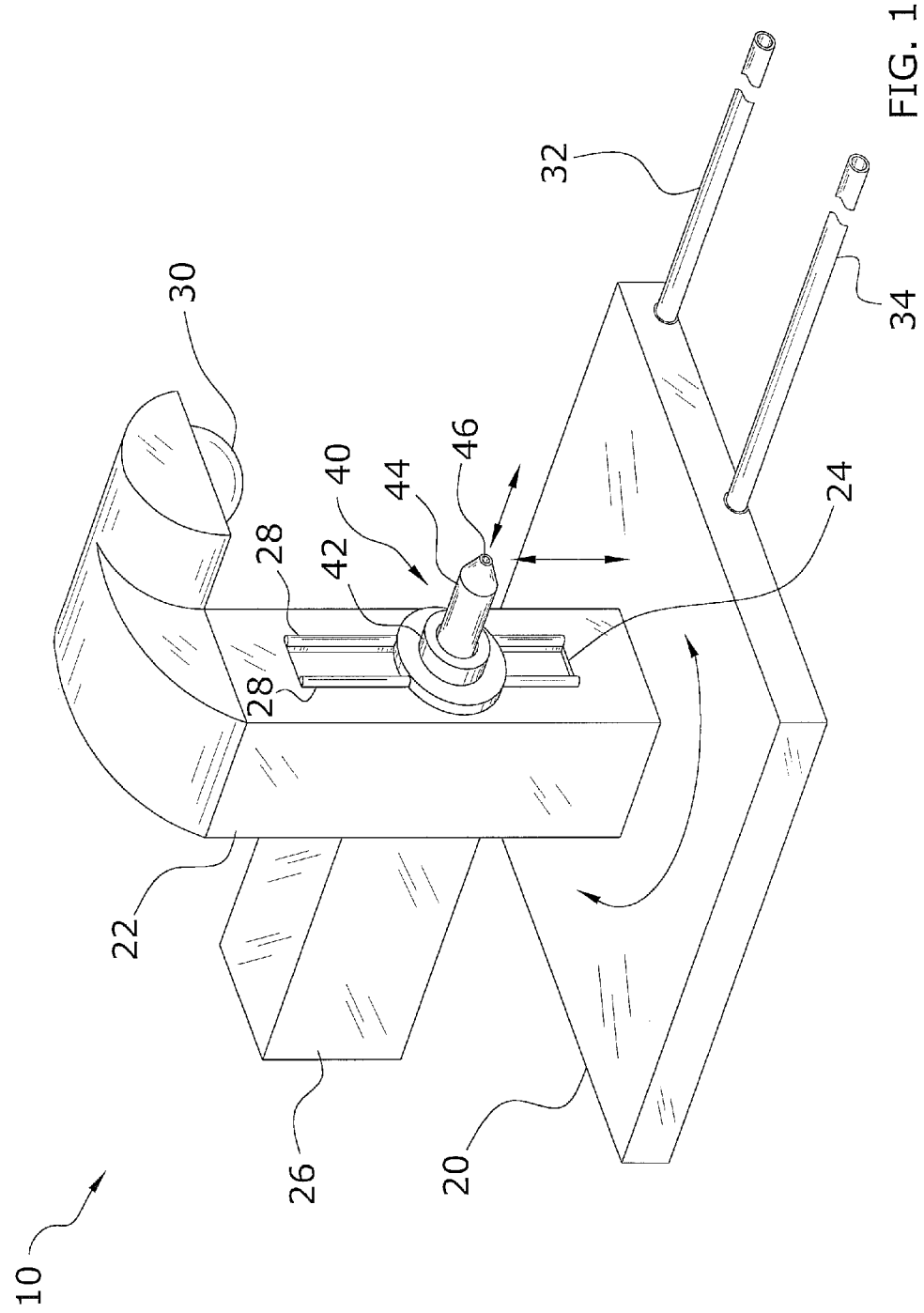
FIG. 1 is an upper perspective view of the present invention.

Turning now descriptively to the drawings, in which similar reference characters denote similar elements throughout the several views, FIGS. 1 through 8 illustrate a tire dressing system 10, which comprises a support unit 22, a spray unit 40 movably positioned within the support unit 22, an actuator unit 50 connected to the spray unit 40, a tire sensor 30 to determine the size of a vehicle tire 12, and a tire position sensor to determine the location of the vehicle tire 12. The spray unit 40 includes a hollow cone nozzle 46 telescopically supported within the spray unit 40 to adjust the spray pattern applied to the sidewall 14 of the vehicle tire 12 depending upon the size of the vehicle tire 12. After the size of the vehicle tire 12 is determined, the proximity of the hollow cone nozzle 46 is adjusted to apply the desired spray pattern to the sidewall 14. The hollow cone nozzle 46 then applies the dressing to the sidewall 14 of the vehicle tire 12 as the vehicle moves by the spray unit 40.

A. Reservoir and Pump

Figure 8:
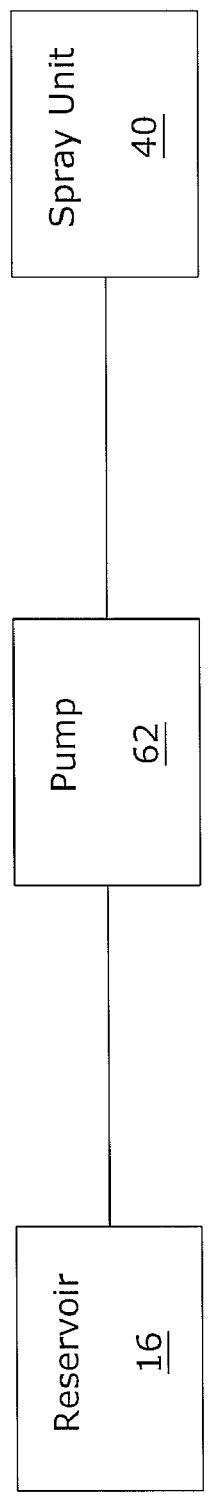
FIG. 8 is a block diagram illustrating the fluid communications within the present invention.

FIG. 8 illustrates a reservoir 16 for storing a volume of tire dressing fluidly connected to a pump 62 that provides a pressurized flow of the tire dressing to the spray unit 40 for dispensing upon the sidewall 14 of the vehicle tire 12. The reservoir 16 may be comprised of various structures capable of storing a significant volume of tire dressing for extended periods of time.

The pump 62 may be comprised of any device capable of generating a pressurized flow of tire dressing from the reservoir 16 to the spray unit 40. The tire dressing may be comprised of any type of tire dressing having a liquid state that allows for application through a hollow cone nozzle 46.

The pump 62 preferably is capable of varying the flow rate to dispense various volumes of tire dressing to the sidewall 14 of the vehicle tire 12 based upon the size of the vehicle tire 12 and/or the sidewall 14. For example, for a larger vehicle tire 12 a higher flow rate would be used and for a smaller vehicle tire 12 a lower flow rate would be used assuming a similar period of application time. The flow rate of the tire dressing from the pump 62 may also be adjusted based upon the type of tire dressing 12 used because differing tire dressings have different coverage rates. In addition, the flow rate of the tire dressing from the pump 62 may be adjusted based upon the specifications ordered by a customer (e.g. higher shine, lower shine).

B. Support Unit

FIGS. 1 through 4d illustrate an exemplary support unit 22 used to support and adjust the spray unit 40. The support unit 22 preferably also supports the sensors used to detect the presence, distance and size of the vehicle tire 12 and/or the sidewall 14. The support unit 22 preferably has a substantially vertical structure and a height that is above the center of most vehicle tires 12.

Figure 2:
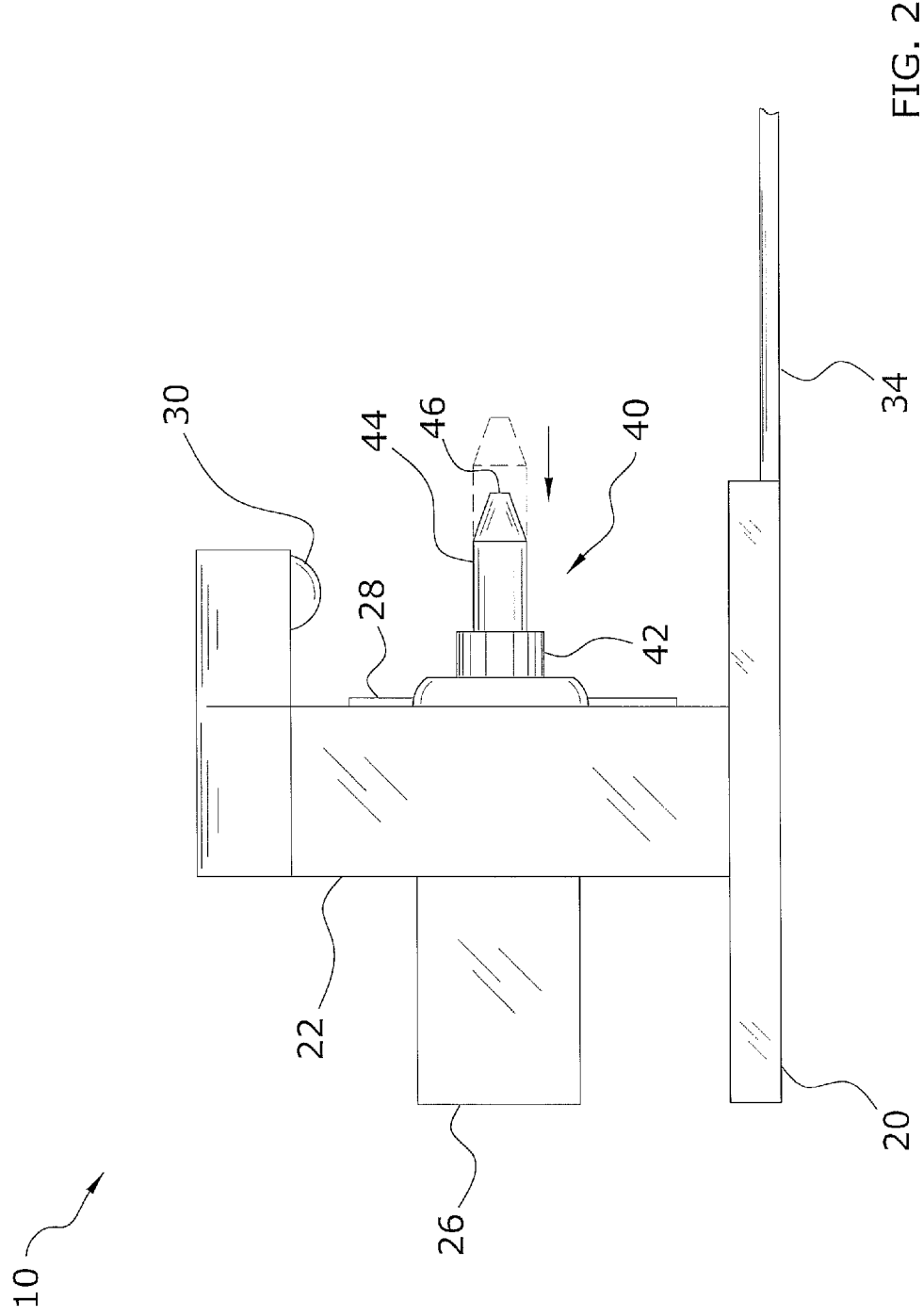
FIG. 2 is a front view of the present invention.

The support unit 22 preferably is attached to a base 20 as shown in FIGS. 1 and 2 of the drawings. The base 20 is attached to the floor of the automated carwash with conventional fasteners. The support unit 22 extends upwardly from the base 20 and is preferably rotatably attached to the base 20 in a breakaway manner to avoid damage to the present invention if a vehicle should accidentally engage the present invention. The rotation of the support unit 22 as shown in FIG. 1 of the drawings prevents damage to the sensors and the spray unit 40 in particular.

The support unit 22 preferably includes a vertical slot 24 as illustrated in FIG. 1 of the drawings. The vertical slot 24 movably receives the spray unit 40 the vertical slot 24 in a vertical moving manner so the spray unit 40 can be adjusted vertically depending upon the size of the vehicle tire 12.

At least one vertical guide rail is preferably attached to the support unit 22 in a vertical manner as shown in FIG. 1 of the drawings. The spray unit 40 is slidably positioned upon the vertical guide rail wherein the vertical guide rail assists in supporting the weight of the spray unit 40 as the spray unit 40 is extended outwardly. It is preferable to utilize a pair of substantially parallel vertical guide rails 28 as illustrated in FIG. 1 of the drawings.

C. Spray Unit

The spray unit 40 is movably positioned within the support unit 22 as illustrated in FIGS. 1 and 2 of the drawings. The spray unit 40 is further fluidly connected to the pump 62 as shown in FIG. 8 of the drawings. The spray unit 40 preferably sprays the sidewall 14 while the vehicle tire 12 while the vehicle is still moving or stationary.

The spray unit 40 includes at least one hollow cone nozzle 46 that sprays the tire dressing in a hollow cone pattern as best illustrated in FIG. 3b of the drawings. The hollow cone nozzle 46 may have a spray pattern that is static or adjustable. The hollow cone pattern has an impact area approximately equal to the sidewall 14 of the vehicle tire 12. The impact area is preferably adjusted by adjusting the proximity distance of the hollow cone pattern with respect to the sidewall 14 of the vehicle tire 12. However, if the spray pattern of the hollow cone nozzle 46 is adjustable, the proximity distance does not require adjustment and only the angle within the hollow spray cone is adjusted to achieve the desired impact area on the vehicle tire 12.

In particular, the hollow cone nozzle 46 is preferably telescopically supported within the spray unit 40 to adjust a proximity distance between the hollow cone nozzle 46 and the sidewall 14 base upon the size and the location of the sidewall 14. FIG. 2 best illustrates wherein the spray unit 40 is preferably comprised of a body 42 and a nozzle carrier 44 telescopically extending from the body 42 along with the hollow cone nozzle 46 positioned within a distal portion of the nozzle carrier 44 to dispense the tire dressing upon the sidewall 14. The nozzle carrier 44 is moved outwardly or inwardly to adjust a proximity distance between the hollow cone nozzle 46 and the sidewall 14 based upon the size and the location of the sidewall 14. The spray unit 40 includes an actuator that extends and retracts the nozzle carrier 44 that is in communication with the control unit 60.

D. Actuator Unit

The actuator unit 50 is connected to the support unit 22 and the spray unit 40 to adjust the vertical position of the spray unit 40 within the support unit 22 and with respect to the vehicle tire 12. The actuator unit 50 may be comprised of various types of actuator devices capable of moving objects such as but not limited to pneumatic actuators and electric motor actuators. A housing 26 attached to the support unit 22 preferably receives and protects the actuator unit 50.

E. Sensors

At least one sensor is used to determine a location and a size of a vehicle tire 12 and/or a sidewall 14. The size of the sidewall 14 can be typically determined by the size of the vehicle tire 12. The sensors are preferably attached to the support unit 22 as illustrated in FIG. 1 of the drawings. The sensors are further in communication with the control unit 60 to provide the data required by the control unit 60 to adjust the vertical position of the spray unit 40 and the proximity distance of the hollow cone nozzle 46 with respect to the sidewall 14 of the vehicle tire 12.

The at least one sensor is preferably comprised of a tire sensor 30, a first sensor 32 and a second sensor 34. The tire sensor 30 determines the size of the vehicle tire 12 and/or just the sidewall 14. The tire sensor 30 is preferably attached to an upper portion of the support unit 22 as illustrated in FIG. 1 of the drawings. The tire sensor 30 may used various types of sensing technology to remotely determine the size of the vehicle tire 12 and sidewall 14 such as but not limited to ultrasonic, radar, infrared and imaging.

The first sensor 32 determines whether the vehicle tire 12 is approaching the spray unit 40. The first sensor 32 determines when to activate the sensing of the size of the vehicle tire 12 and sidewall 14. As shown in FIG. 1 of the drawings, the first sensor 32 is preferably comprised of a pressure type sensor that the vehicle tire 12 passes over and activates. The first sensor 32 is preferably positioned along the path of the vehicle prior to vehicle tire 12 becoming concentrically aligned with the hollow cone nozzle 46.

The second sensor 34 determines whether the vehicle tire 12 is substantially concentrically aligned with the hollow cone nozzle 46 which indicates when to spray the vehicle tire 12 with the tire dressing. As shown in FIG. 1 of the drawings, the second sensor 34 is preferably comprised of a pressure type sensor that the vehicle tire 12 passes over and activates. The second sensor 34 is preferably positioned along the path of the vehicle and is preferably aligned with the hollow cone nozzle 46 to indicate when the vehicle tire 12 is centered with respect to the hollow cone nozzle 46.

F. Control Unit

Figure 7:
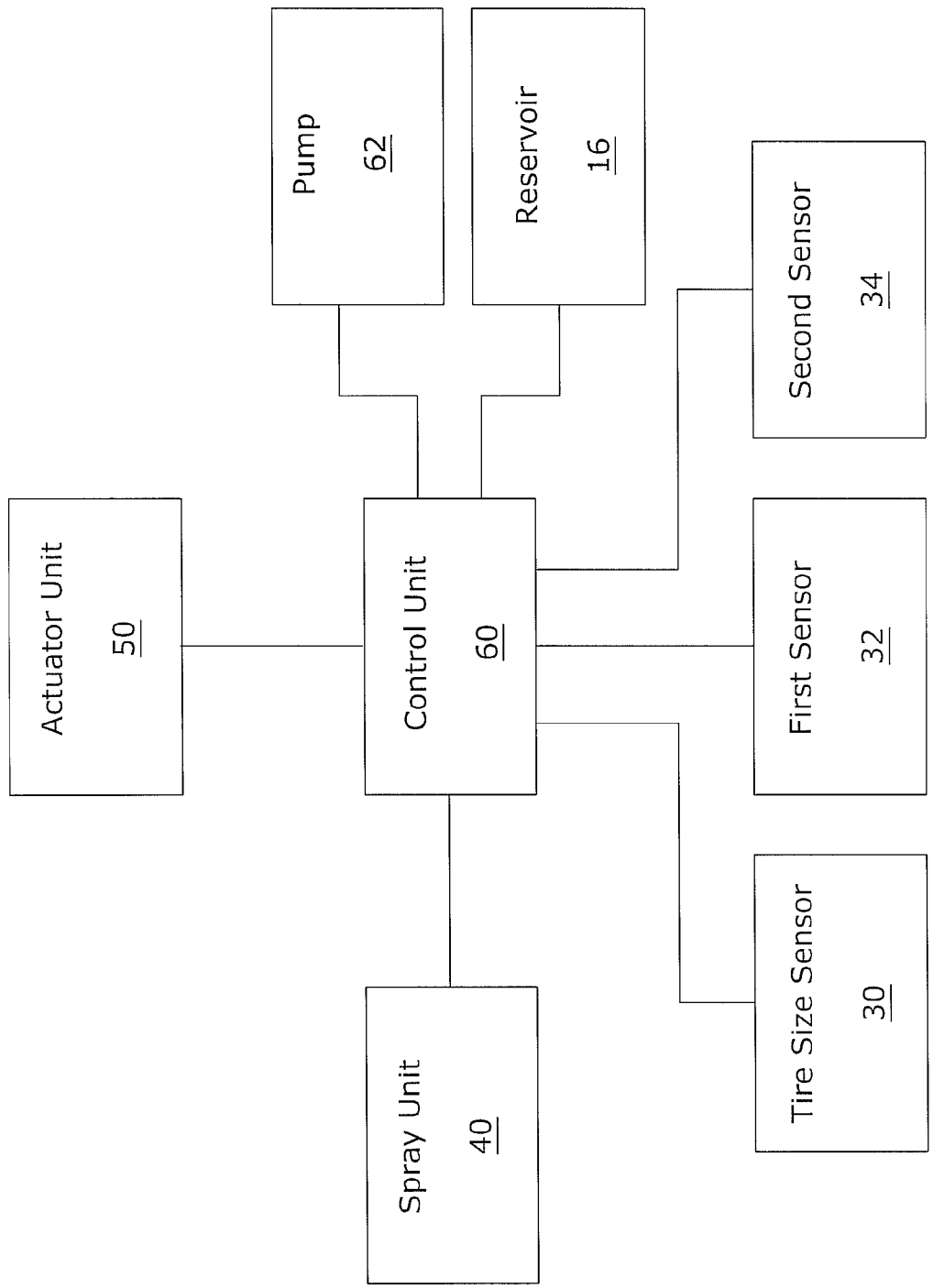
FIG. 7 is a block diagram illustrating the communications between the control unit and various devices.

The control unit 60 in communication with the first sensor 32, the second sensor 34, the tire sensor 30, the spray unit 40, the pump 62, the reservoir 16 and the actuator unit 50 as illustrated in FIG. 7 of the drawings. The control unit 60 determines a desired position for the hollow cone nozzle 46 base upon the size of the sidewall 14 and the location of the sidewall 14. In particular, the control unit 60 determines the desired proximity distance and vertical position of the hollow cone nozzle 46 base upon various factors including the pressure from the pump 62, the spray angle of the hollow spray cone and the size of the vehicle tire 12 and sidewall 14.

The control unit 60 communicates to the actuator unit 50 the desired position of the hollow cone nozzle 46 including the vertical position and the extended position of the hollow cone nozzle 46. The actuator unit 50 moves the spray unit 40 to the desired vertical position prior to spraying the sidewall 14 with the tire dressing. The spray unit 40 adjusts the extended position of the hollow cone nozzle 46 thereby adjusting the proximity distance of the hollow cone nozzle 46 with respect to the sidewall 14 of the vehicle tire 12.

G. Operation

Figure 3A:
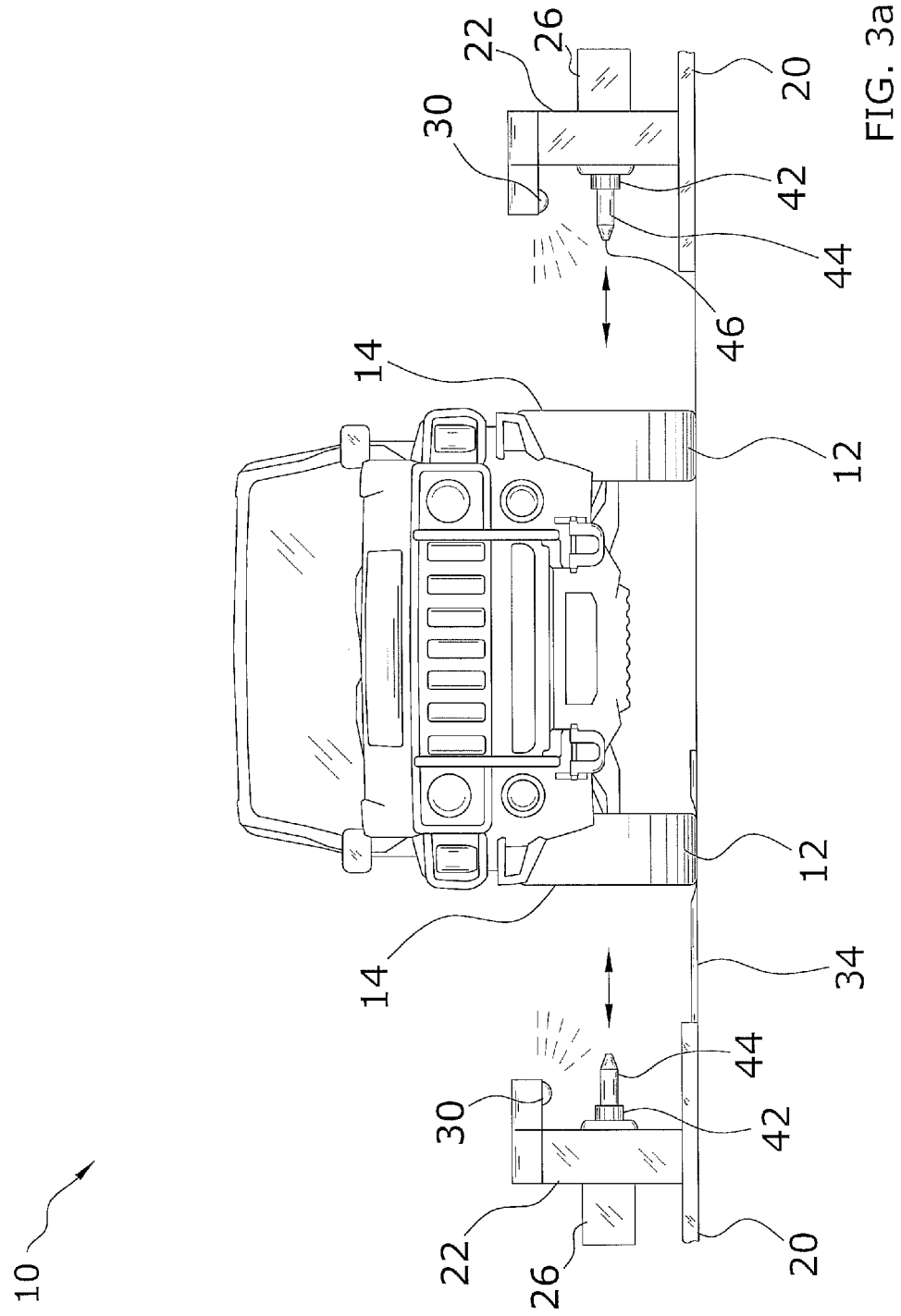
FIG. 3a is a front view of the present invention with a vehicle moving past the present invention.
Figure 4A:
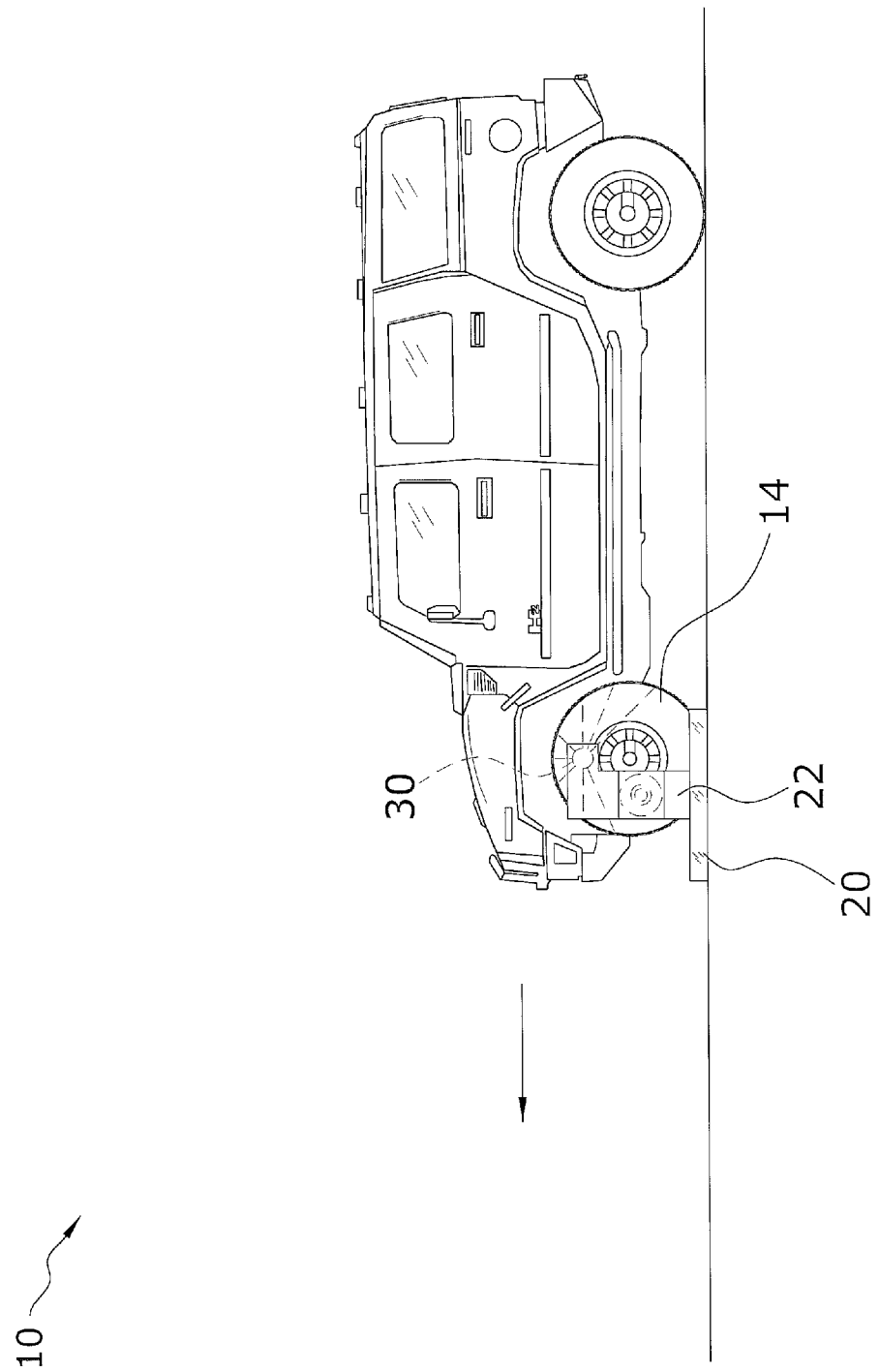
FIG. 4a is a side view of the present invention measuring the size of the vehicle tire.
Figure 4B:
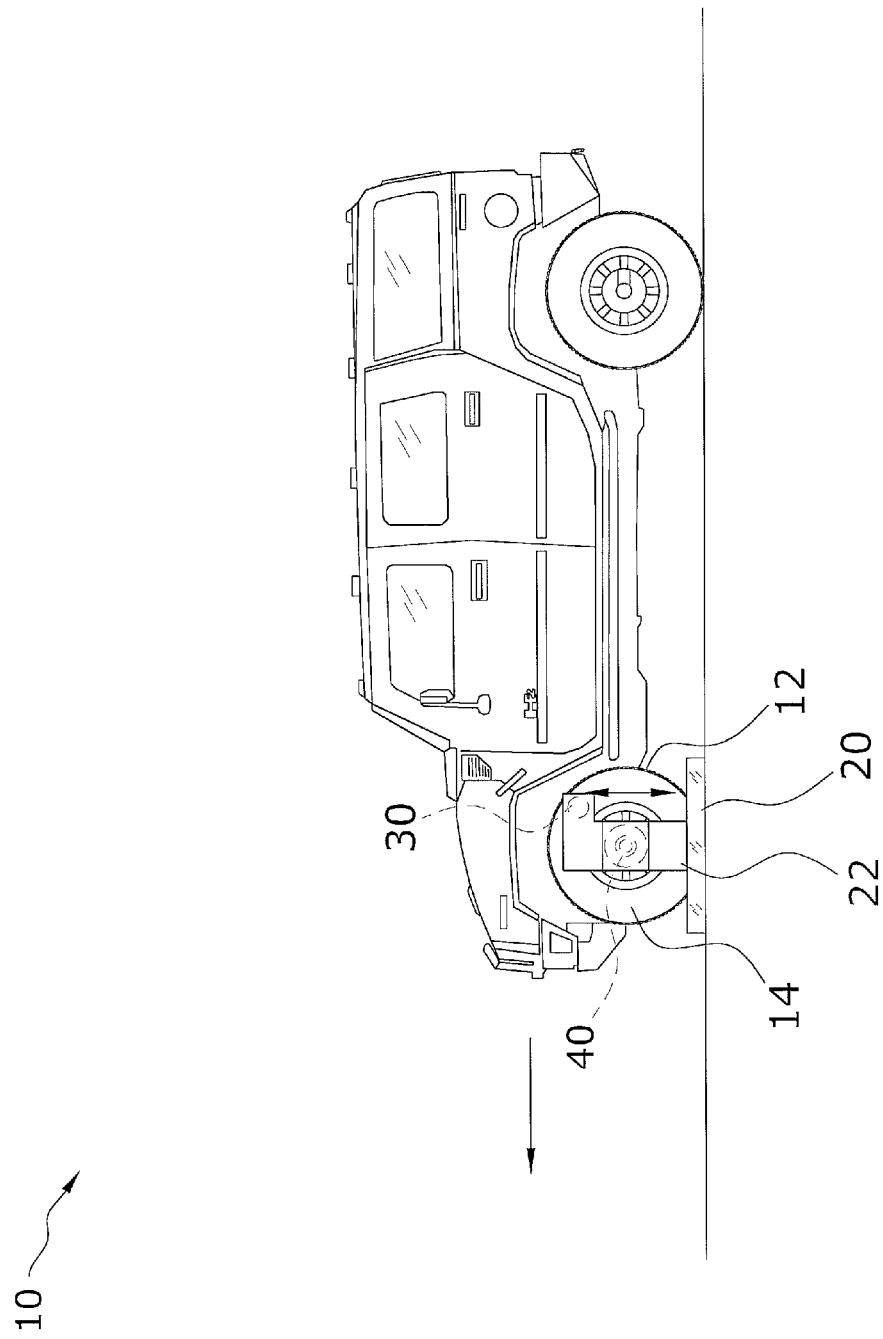
FIG. 4b is a side view of the present invention with the vehicle tire sensed to be substantially aligned with the hollow cone nozzle.
Figure 4C:
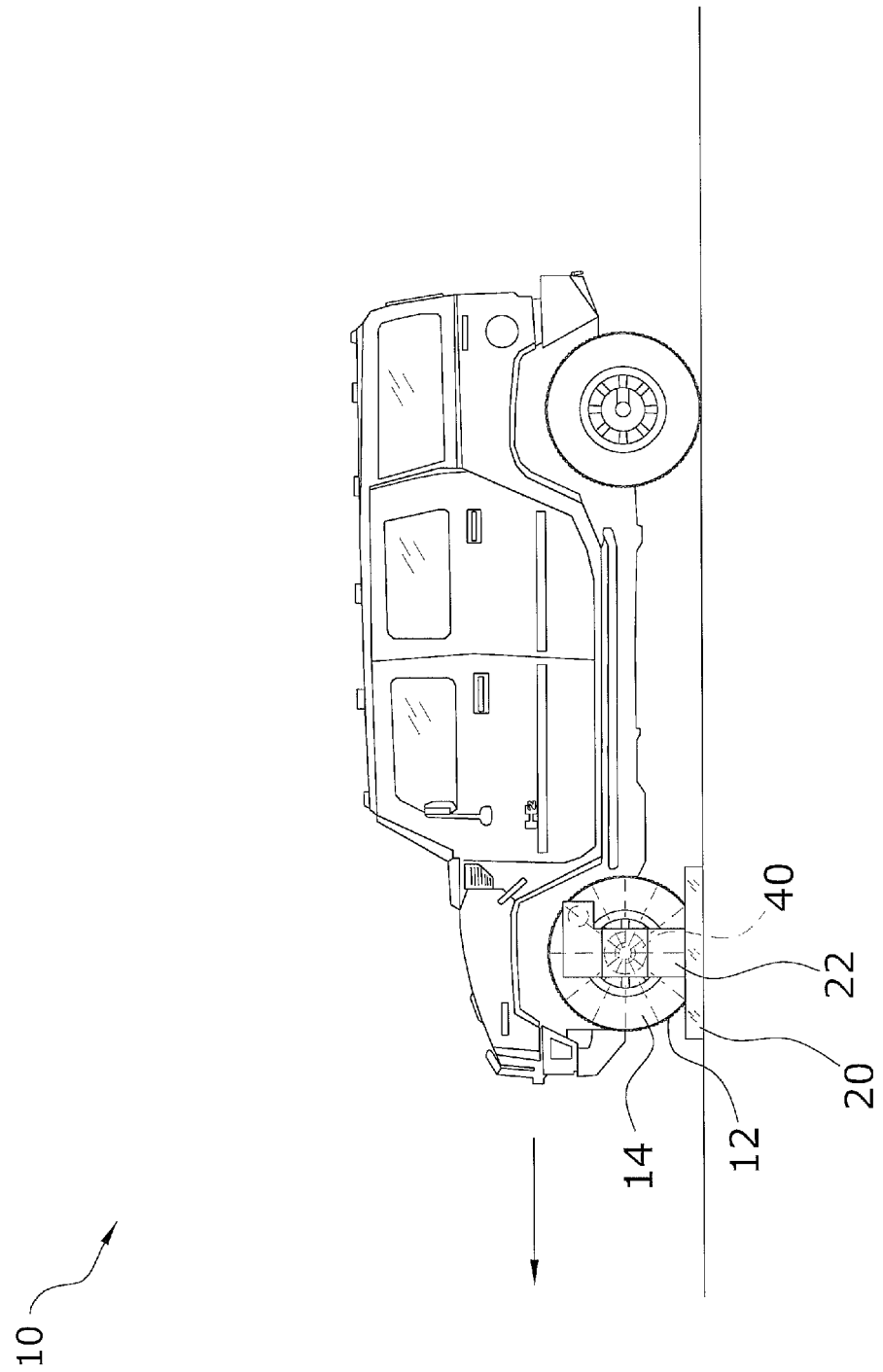
FIG. 4c is a side view with the hollow cone nozzle applying a spray of tire dressing on the front vehicle tire.
Figure 4D:
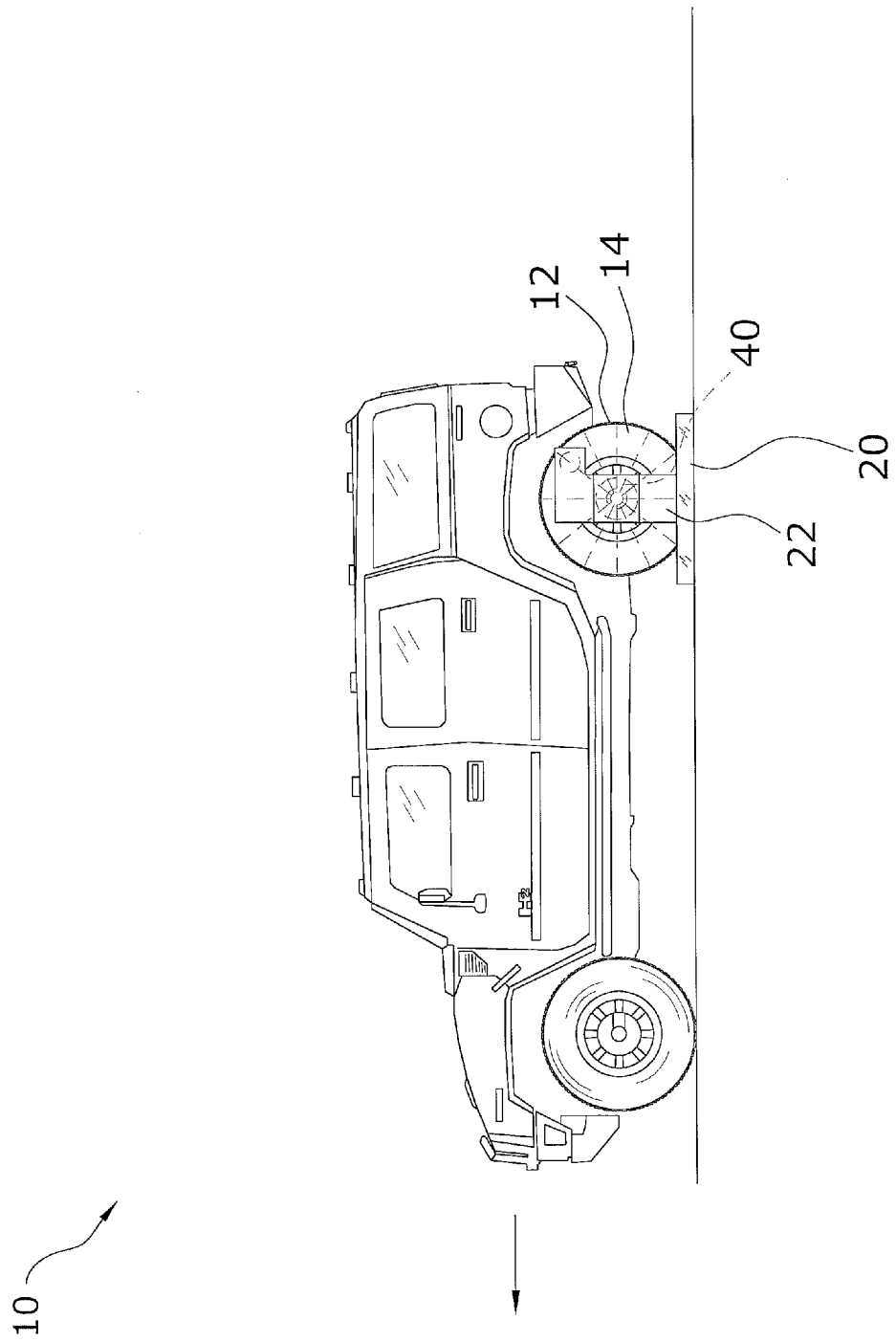
FIG. 4d is a side view with the hollow cone nozzle applying a spray of tire dressing on the rear vehicle tire.
Figure 5:
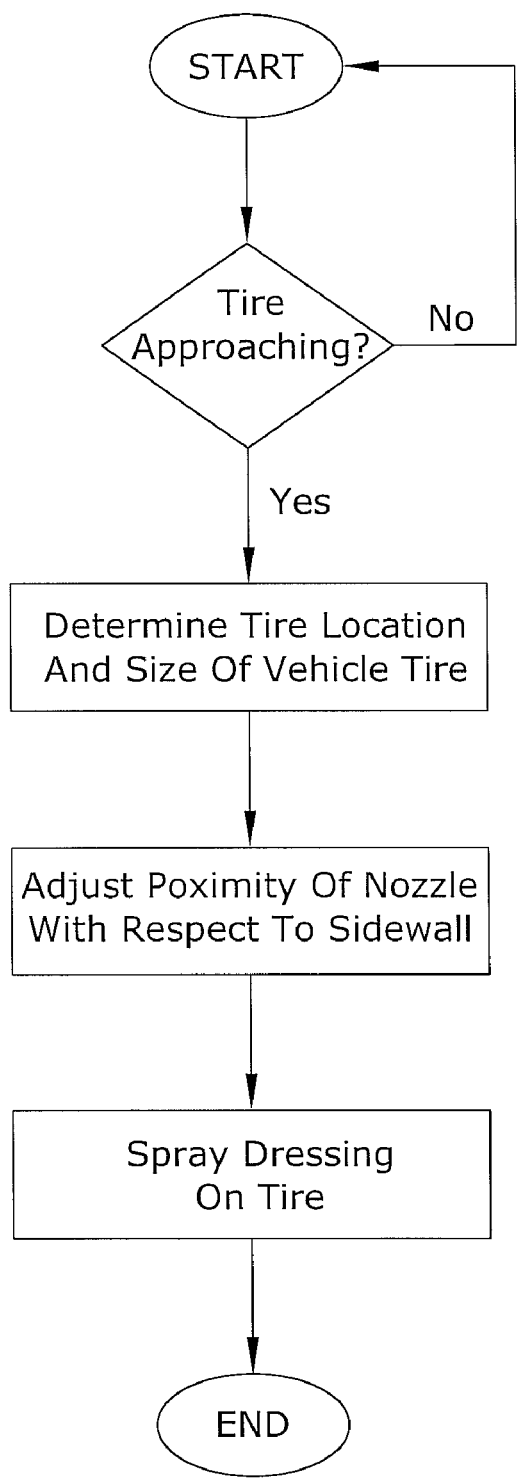
FIG. 5 is a flowchart illustrating the overall operation of the present invention.
Figure 6:
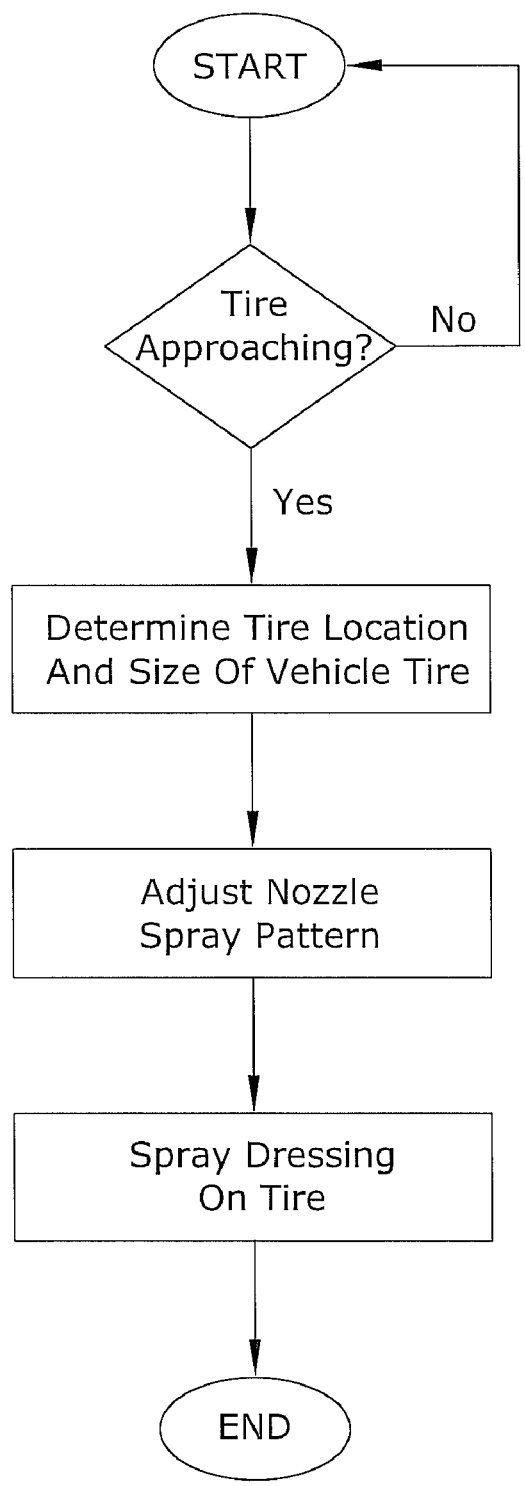
FIG. 6 is a flowchart illustrating the overall operation of an alternative embodiment of the present invention using an adjustable nozzle.

The present invention is preferably used within an automated carwash used to automatically wash vehicles. The present invention is further preferably positioned near or at the exit of the automated carwash to apply the tire dressing after the vehicle has been washed. The present invention may also be used in a semi-automated or manual carwash. It can be appreciated that the present invention is preferably implemented on both sides of the vehicle as best illustrated in FIGS. 3a and 3b of the drawings with a pair of units. Alternatively, four units can be used to simultaneously apply the tire dressing to all four tires at the same time, however it is preferably to utilize only two units because of economics and differing vehicle lengths.

After the vehicle has been washed within the carwash, the vehicle proceeds forwardly toward the exit of the carwash. As the front vehicle tires 12 of the vehicle engage the first sensor 32, the first sensor 32 notifies the control unit 60 that a vehicle tire 12 is approaching. The control unit 60 activates the tire sensor 30 to determine the size and position of the respective vehicle tire 12 and sidewall 14. The tire sensor 30 sends the size and position data to the control unit 60 which then calculates the desired vertical position and proximity distance of the hollow cone nozzle 46 to accurately spray the sidewall 14 with the tire dressing.

The control unit 60 then activates the actuator unit 50 to manipulate the vertical position of the spray unit 40 so that the hollow cone nozzle 46 has a height approximately equal to the center of the vehicle tire 12 being sprayed. The control unit 60 further activates the spray unit 40 to adjust the nozzle carrier 44 so that the hollow cone nozzle 46 has a desired proximity distance with respect to the sidewall 14 of the vehicle tire 12.

Once the vehicle tire 12 passes over the second sensor 34 which is positioned behind the first sensor 32, the second sensor 34 notifies the control unit 60 that the vehicle tire 12 is aligned with the hollow cone nozzle 46. The control unit 60 then activates the pump 62 and/or a valve to allow pressurized tire dressing to be sprayed from the hollow cone nozzle 46 upon the sidewall 14 of the vehicle tire 12 when the hollow cone nozzle 46 is substantially concentric with respect to the vehicle tire 12. The hollow cone pattern has an impact area approximately equal to the sidewall 14 of the vehicle tire 12 and thereby applies the tire dressing mainly to the sidewall 14 of the vehicle tire 12 with limited under spray or over spray. After the desired amount of tire dressing has been applied to the sidewall 14 of the vehicle tire 12, the pump 62 and/or valve are deactivated thereby terminating the spraying of the tire dressing upon the vehicle tire 12. The above process is then repeated when the rear tires of the vehicle approach the present invention so that all four tires of the vehicle are applied with the tire dressing.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A tire dressing system, comprising:
   a reservoir for storing a volume of tire dressing;
   a pump fluidly connected to said reservoir;
   a support unit;
   a spray unit movably positioned within said support unit and fluidly connected to said pump, wherein said spray unit includes a hollow cone nozzle that sprays a tire dressing in a hollow cone pattern;
   an actuator unit connected to said support unit and said spray unit, wherein said actuator unit moves said spray unit;
   at least one sensor to determine a location and a size of a vehicle tire; and
   a control unit in communication with said at least one sensor and said actuator unit, wherein said control unit determines a desired position for said hollow cone nozzle based upon the size of the vehicle tire and the location of the vehicle tire, wherein said control unit communicates to said actuator unit said desired position and wherein said actuator unit moves said spray unit to said desired position prior to spraying a sidewall of the vehicle tire with the tire dressing;
   wherein said support unit includes a vertical slot, wherein said spray unit movably extends within said vertical slot in a vertical moving manner.

2. The tire dressing system of claim 1, wherein said hollow cone nozzle has an adjustable spray pattern.

3. The tire dressing system of claim 1, wherein said hollow cone nozzle has a static spray pattern.

4. The tire dressing system of claim 1, wherein said hollow cone nozzle sprays the sidewall while the vehicle tire is moving.

5. The tire dressing system of claim 1, wherein said hollow cone nozzle sprays the sidewall while the vehicle tire is stationary.

6. The tire dressing system of claim 1, wherein said hollow cone nozzle is telescopically supported within said spray unit to adjust a proximity distance between said hollow cone nozzle and the sidewall based upon the size and the location of the vehicle tire.

7. The tire dressing system of claim 1, wherein said spray unit is comprised of a body and a nozzle carrier telescopically extending from said body, wherein said hollow cone nozzle is positioned within a distal portion of said nozzle carrier.

8. The tire dressing system of claim 7, wherein said nozzle carrier is moved outwardly or inwardly to adjust a proximity distance between said hollow cone nozzle and the sidewall based upon the size and the location of the vehicle tire.

9. The tire dressing system of claim 1, wherein said hollow cone pattern has an impact area approximately equal to the sidewall of the vehicle tire.

10. The tire dressing system of claim 1, wherein said at least one sensor is comprised of a tire sensor to determine the size of the vehicle tire, a first sensor to determine whether the vehicle tire is approaching said spray unit and a second sensor to determine whether the vehicle tire is substantially concentrically aligned with said hollow cone nozzle.

11. The tire dressing system of claim 1, including at least one vertical guide rail attached to said support unit in a vertical manner and wherein said spray unit is slidably positioned upon said at least one vertical guide rail.

12. The tire dressing system of claim 1, including a base, wherein said support unit extends upwardly from said base and wherein said support unit is rotatably attached to said base.

13. A tire dressing system, comprising:
   a reservoir for storing a volume of tire dressing;
   a pump fluidly connected to said reservoir;
   a support unit;
   a spray unit movably positioned within said support unit and fluidly connected to said pump, wherein said spray unit includes a hollow cone nozzle that sprays a tire dressing in a hollow cone pattern;
   wherein said support unit includes a vertical slot, wherein said spray unit movably extends within said vertical slot in a vertical moving manner;
   wherein said hollow cone pattern has an impact area approximately equal to the sidewall of the vehicle tire;
   wherein said hollow cone nozzle is telescopically supported within said spray unit to adjust a proximity distance between said hollow cone nozzle and the sidewall based upon the size and the location of the vehicle tire;
   wherein said spray unit is comprised of a body and a nozzle carrier telescopically extending from said body, wherein said hollow cone nozzle is positioned within a distal portion of said nozzle carrier;
   wherein said nozzle carrier is moved outwardly or inwardly to adjust a proximity distance between said hollow cone nozzle and the sidewall based upon the size and the location of the vehicle tire;
   an actuator unit connected to said support unit and said spray unit, wherein said actuator unit moves said spray unit;
   at least one sensor to determine a location and a size of a vehicle tire;
   wherein said at least one sensor is comprised of a tire sensor to determine the size of the vehicle tire, a first sensor to determine whether the vehicle tire is approaching said spray unit and a second sensor to determine whether the vehicle tire is substantially concentrically aligned with said hollow cone nozzle; and
   a control unit in communication with said at least one sensor and said actuator unit, wherein said control unit determines a desired position for said hollow cone nozzle based upon the size and the location of the vehicle tire, wherein said control unit communicates to said actuator unit said desired position and wherein said actuator unit moves said spray unit to said desired position prior to spraying a sidewall of the vehicle tire with the tire dressing.

14. The tire dressing system of claim 13, wherein said hollow cone nozzle has an adjustable spray pattern.

15. The tire dressing system of claim 13, wherein said hollow cone nozzle has a static spray pattern.

16. The tire dressing system of claim 13, wherein said hollow cone nozzle sprays the sidewall while the vehicle tire is moving or stationary.

17. The tire dressing system of claim 13, including at least one vertical guide rail attached to said support unit in a vertical manner and wherein said spray unit is slidably positioned upon said at least one vertical guide rail.

18. The tire dressing system of claim 13, including a base, wherein said support unit extends upwardly from said base and wherein said support unit is rotatably attached to said base.

* * * * *